United States Patent [19]

Ikegaya et al.

[11] Patent Number: 5,487,583
[45] Date of Patent: Jan. 30, 1996

[54] LATERALLY ADJUSTABLE AUTOMOTIVE SEAT WITH LIFTER DEVICE

[75] Inventors: Isao Ikegaya; Noboru Mochizuki, both of Kosai, Japan

[73] Assignee: Fuji Kiko Co., Ltd., Tokyo, Japan

[21] Appl. No.: 158,309

[22] Filed: Nov. 29, 1993

[30] Foreign Application Priority Data

Nov. 30, 1992 [JP] Japan ................. 4-082434 U
Nov. 30, 1992 [JP] Japan ................. 4-082435 U

[51] Int. Cl.$^6$ .............................................. B60N 2/04
[52] U.S. Cl. .............................................. 296/65.1
[58] Field of Search ............... 296/65.1, 63; 248/429, 248/430, 421

[56] References Cited

U.S. PATENT DOCUMENTS

| | | | |
|---|---|---|---|
| 2,921,621 | 1/1960 | Williams et al. | 296/65.1 X |
| 2,983,545 | 5/1961 | Garvey et al. | 296/65.1 |
| 4,309,015 | 1/1982 | Mühr | 248/396 |
| 5,123,622 | 6/1992 | Matsumoto et al. | 248/421 |

FOREIGN PATENT DOCUMENTS

| | | | |
|---|---|---|---|
| 3226585 | 1/1984 | Germany | 248/429 |
| 56-30131 | 3/1981 | Japan . | |
| 134170 | 7/1989 | Japan . | |
| 449526 | 4/1992 | Japan . | |
| 2081082 | 2/1982 | United Kingdom . | |

Primary Examiner—David M. Mitchell
Assistant Examiner—Kia M. Robinson
Attorney, Agent, or Firm—Ronald P. Kananen

[57] ABSTRACT

A seat for an automotive vehicle comprises upper rails engaged with lower rails and having wall portions, a connecting rod rotatably arranged between the wall portions of the upper rails, links mounted to the connecting rod, side brackets rotatably mounted to the links, and base plates mounted to the side brackets.

9 Claims, 7 Drawing Sheets

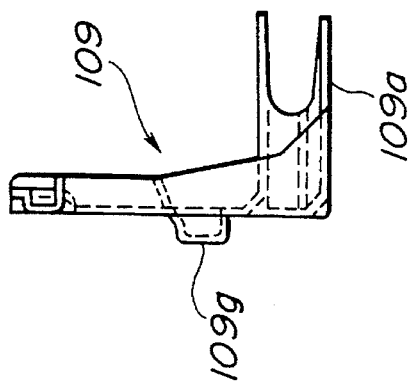
FIG. 8
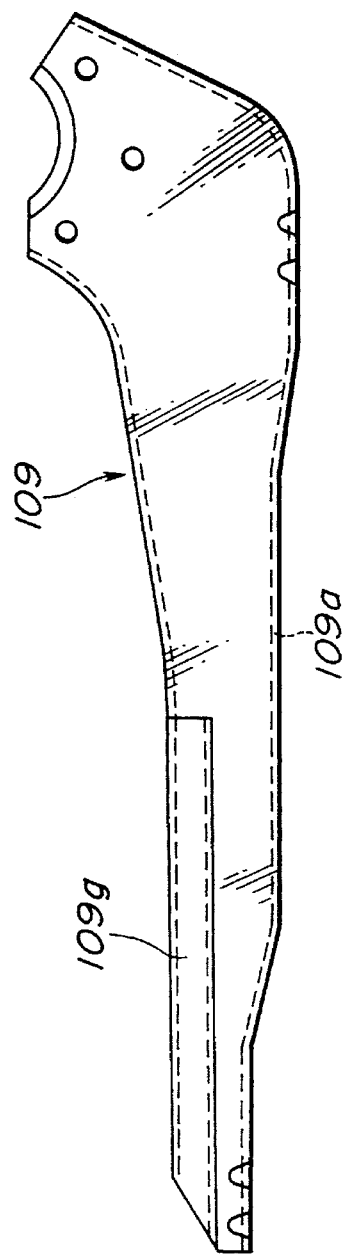
FIG. 6
FIG. 7
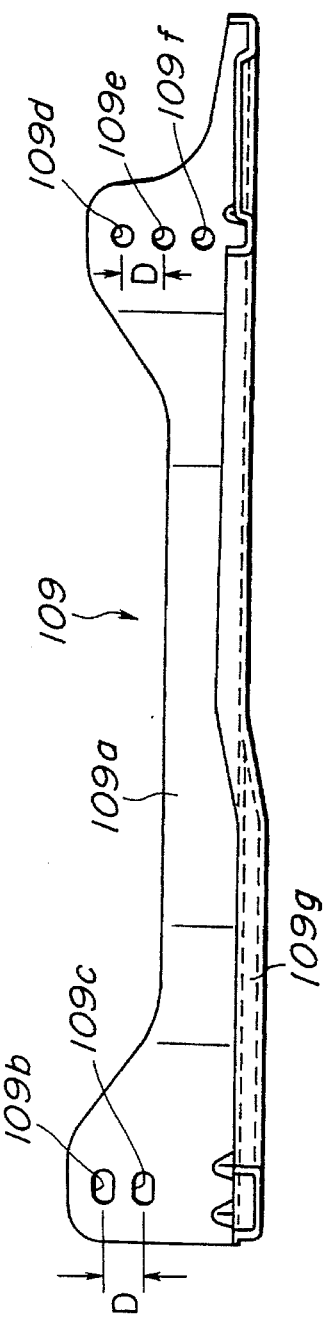

5,487,583

LATERALLY ADJUSTABLE AUTOMOTIVE SEAT WITH LIFTER DEVICE

BACKGROUND OF THE INVENTION

The present invention relates generally to a seat for an automotive vehicle and more particularly, to a seat lifter for use therein.

Various types of seats for an automotive vehicle have been proposed in past years. One is disclosed in U.S. Pat. No. 5,123,622 to Mathumoto et al. Another is disclosed in UK Patent Application GB 2 081 082 A to P.A. Rentrop Hubbert & Wagner.

SUMMARY OF THE INVENTION

An object of the present invention is to provide a seat for an automotive vehicle which is simple in structure, and allows an use of all component parts in both ordinary and higher-grade automotive vehicles.

A seat for a vehicle having a body, according to the invention, includes a pair of first rails mounted to the body of the vehicle, and a pair of second rails, having wall portions, engaged with the pair of first rails. A connecting rod is rotatably arranged between the wall portions of the pair of second rails. A pair of side brackets are rotatably mounted to a pair of links which are mounted to the connecting rod. A pair of base plates are mounted to the pair of side brackets. The base plates have a bottom which has first and second portions, each formed with at least two through holes at a predetermined spaced interval in a cross direction with respect to an imaginary longitudinal axis of the bottom. Because of the coaction of the rear links with the connecting rods mounted to the wall portions of the pair of second rails and the cooperation of the side brackets with the links, an integration of the seat slide mechanism with the seat lifter is achieved with a structure which has a high rigidity to rightward and leftward oscillation.

In an alternative embodiment, the base plate has through holes arranged for connecting the side bracket so that the same seat slide mechanism may be used for alternative types of automobiles In a wider, luxury automobile vehicle, the center of the seat cushion can be moved to the door side from the center console by an interval determined by the seat structure, thus resulting in an enlarged seat interval between the driver's seat and the adjacent passenger's seat.

BRIEF DESCRIPTION OF THE DRAWINGS

FIG. 6 is a view similar to FIG. 5, showing a base plate;

FIG. 7 is a plan view showing the base plate;

FIG. 8 is a view similar to FIG. 1, showing the base plate as viewed from the right in FIG. 6.

DETAILED DESCRIPTION OF THE INVENTION

Figure 1:
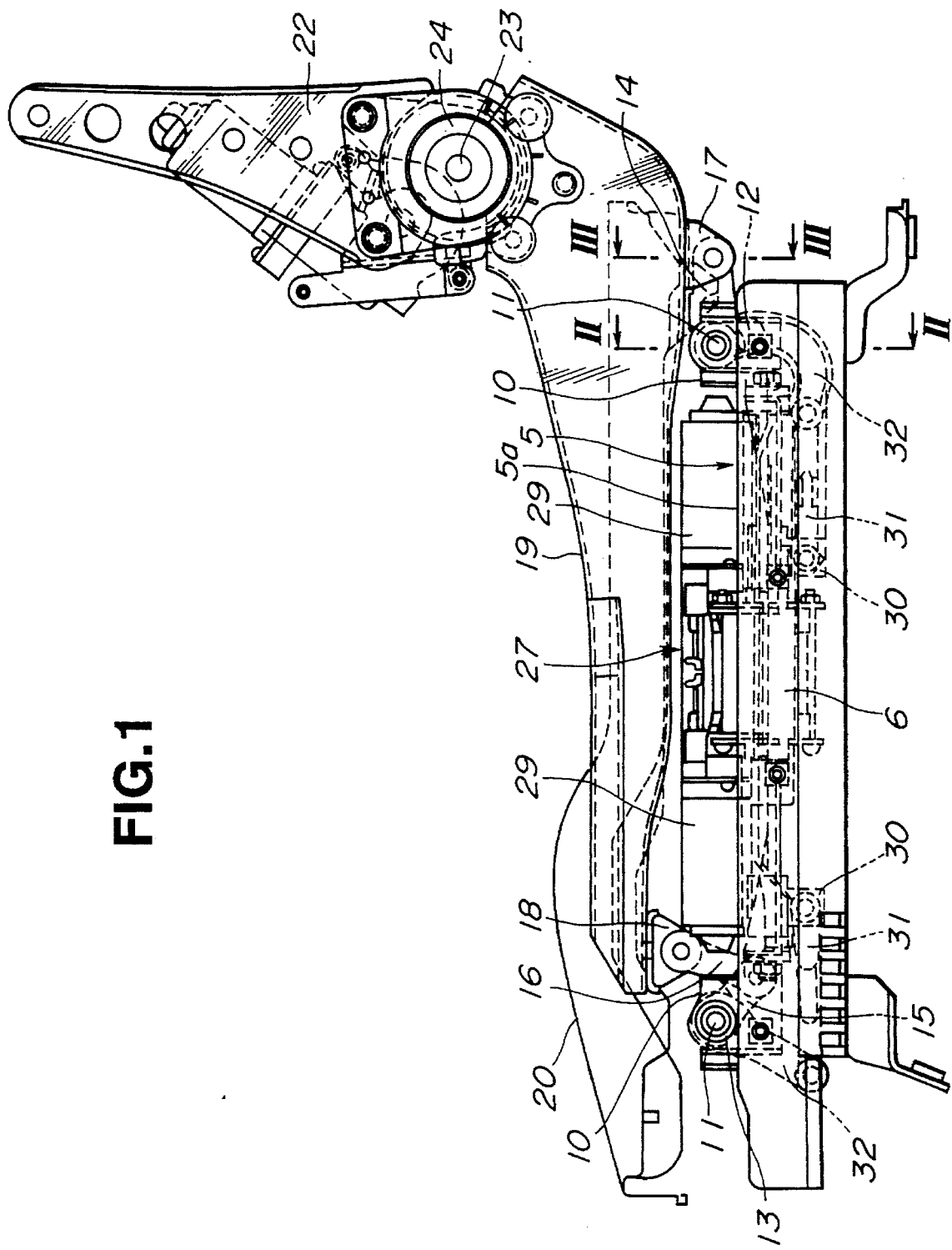
FIG. 1 is a side view showing a first preferred embodiment of a seat according to the present invention.
Figure 2:
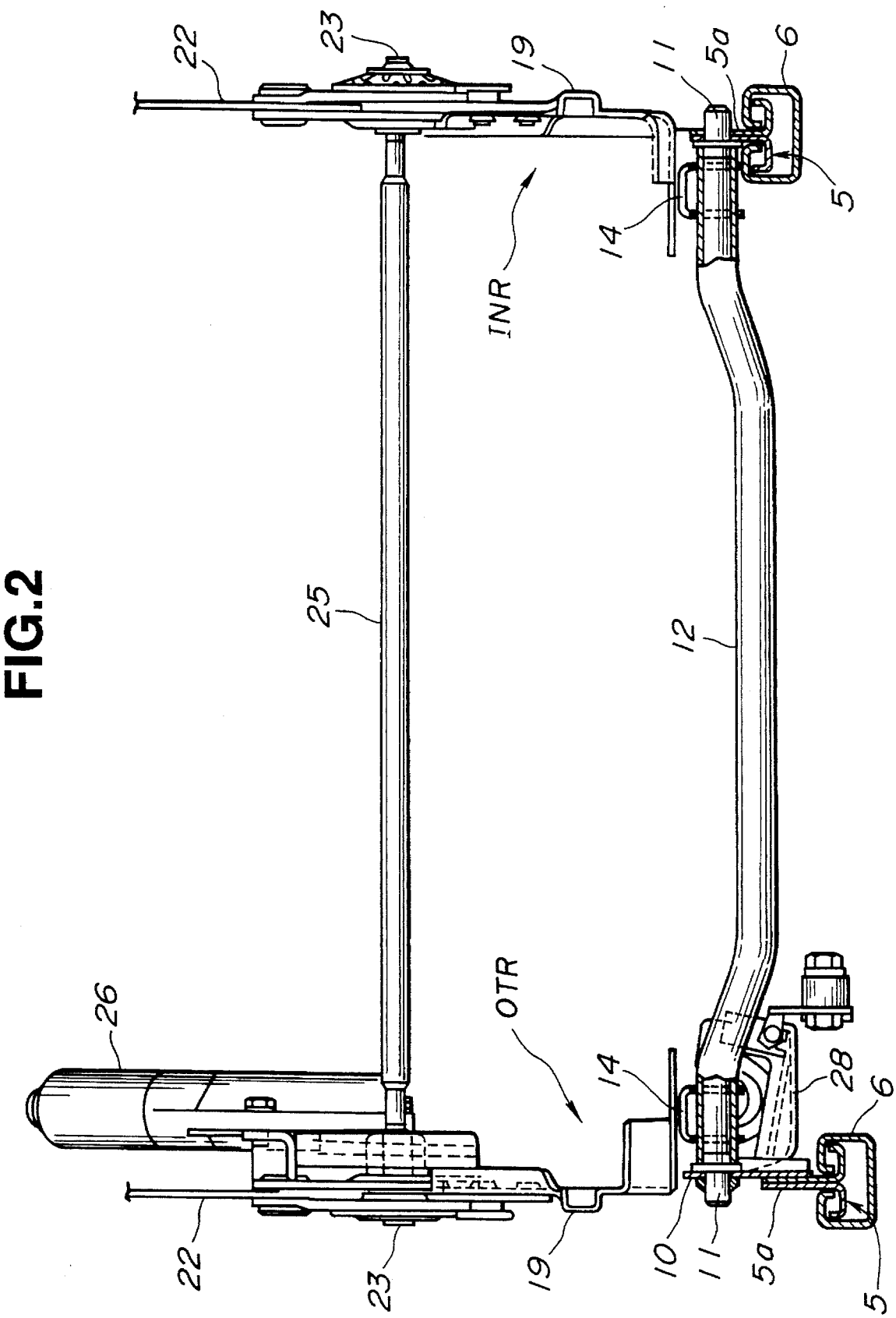
FIG. 2 is a rear view, partly in section taken along the line II—II in FIG. 1, showing the seat.
Figure 3:
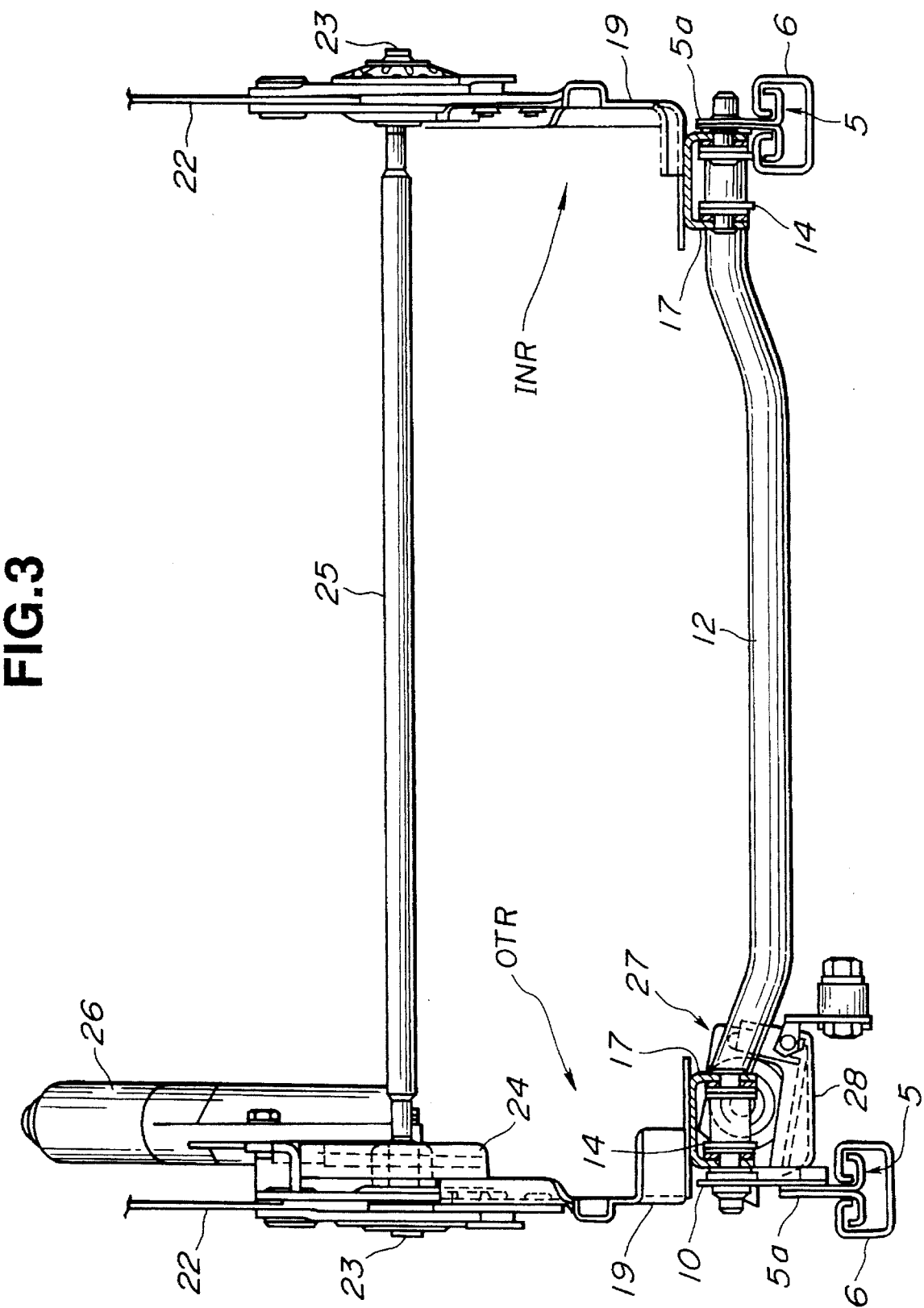
FIG. 3 is a view similar to FIG. 2, taken along the line III—III in FIG. 1.

Referring to FIGS. 1 to 3, there is shown a first preferred embodiment of the present invention. Referring first to FIGS. 1 and 2, a seat slide mechanism is constructed such that inner side (INR) and outer side (OTR) upper rails 5 are engaged with inner side (INR) and outer side (OTR) lower rails 6 mounted to a vehicle body, respectively, so as to be movable in the longitudinal direction thereof, each upper rail 5 including a vertical wall portion 5a and having substantially an inverted T-shaped cross section.

Referring also to FIGS. 1 and 2 supports 10 integrally formed with a motor bracket 28 as will be described later are secured to the vertical wall portion 5a of the outer upper rail 5 in the vicinity of both ends thereof. Connecting rods 12, 13 are rotatably supported to the upper rails 5, each having both ends secured to shafts 11 which are arranged through the support 10 and the vertical portion 5a of the inner upper rail 5, respectively. It is to be noted that since a floor of the vehicular body has a portion in the vicinity of a center box higher than a door side portion, the supports 10 are secured to the outer upper rail 5 so as to horizontally maintain a seat cushion.

As best seen in FIG. 1, links 14, 15 have one end fixed to the connecting rods 12, 13, respectively, by welding or the like, the front link 15 having the other end rotatably mounted to one end of an auxiliary link 16. Side brackets 17, 18 are rotatably mounted to the other ends of the rear link 14 and the auxiliary link 16, respectively. Base plates 19 are fixedly mounted to the side brackets 17, 18, respectively.

As shown in FIGS. 2 and 3, the rear link 14 is of the double support type, and disposed to be in slide contact with an inner part of the side bracket 17 having substantially a U-shaped cross section. The front link 15 and the auxiliary link 16 may be of the single support type instead of the double support type since the front side undergoes a smaller load than the rear side. Therefore, the side bracket 18 has substantially an L-shaped cross section, and not substantially an U-shaped cross section. The links 14, 15 may be disposed to be in slide contact with an inner face of the vertical wall portion 5a of the upper rail 5.

The base plates 19 are members for fixing a seat pan 20 for the seat cushion, each being provided with an arm 22 for inclinably supporting a seat back, and rotatably mounted to the base plate 19 through a hinge 23 as shown in FIGS. 2 and 3. Referring also to FIG. 1, a link rod 25 is arranged to incline and adjust the arms 22 together in the longitudinal direction of the seat slide mechanism through a reduction gear mechanism 24 for rotating the hinge 23. Additionally, a power unit 26 having a motor is arranged to drive the hinge 23.

For rotating the connecting rods 12, 13, a power unit 27 disposed on the motor bracket 28 is fixedly mounted to an inner part of the outer upper rail 5 as shown in FIG. 3. Referring to FIG. 1, arms 31 connected to nut blocks 30 are rotatably mounted to levers 32 fixed to the connecting rods 12, 13 by welding or the like, respectively, each nut block 30 being engaged with a screw shaft of a motor 29 mounted on the motor bracket 28.

Thus, when rotating the screw shafts about an axis thereof, the nut blocks 30 are moved in the axial directions of the screw shafts to press or draw the arms 31. The levers 32 rotate the connecting rods 12, 13 about an axis thereof, so that the links 14, 15, 16 are rotated to raise or lower the base plates 19. Concerning raising and lowering of the base plates 19, since the pair of motors 29 are oppositely mounted to the motor bracket 28, front and rear portions of the seat cushion can be raised or lowered independently.

As described above, with the rear side of a seat lifter, since the rear links 14 of a double support type are connected to the connecting rod 12 which is disposed perpendicular to the vertical wall portions 5a of the upper rails 5 and rotatably supported thereto, and the side brackets 17 having substantially a U-shaped section are rotatably mounted to the links 14, an integration of the seat slide mechanism with the seat lifter is achieved, which presents high rigidity to rightward and leftward oscillation.

Figure 4:
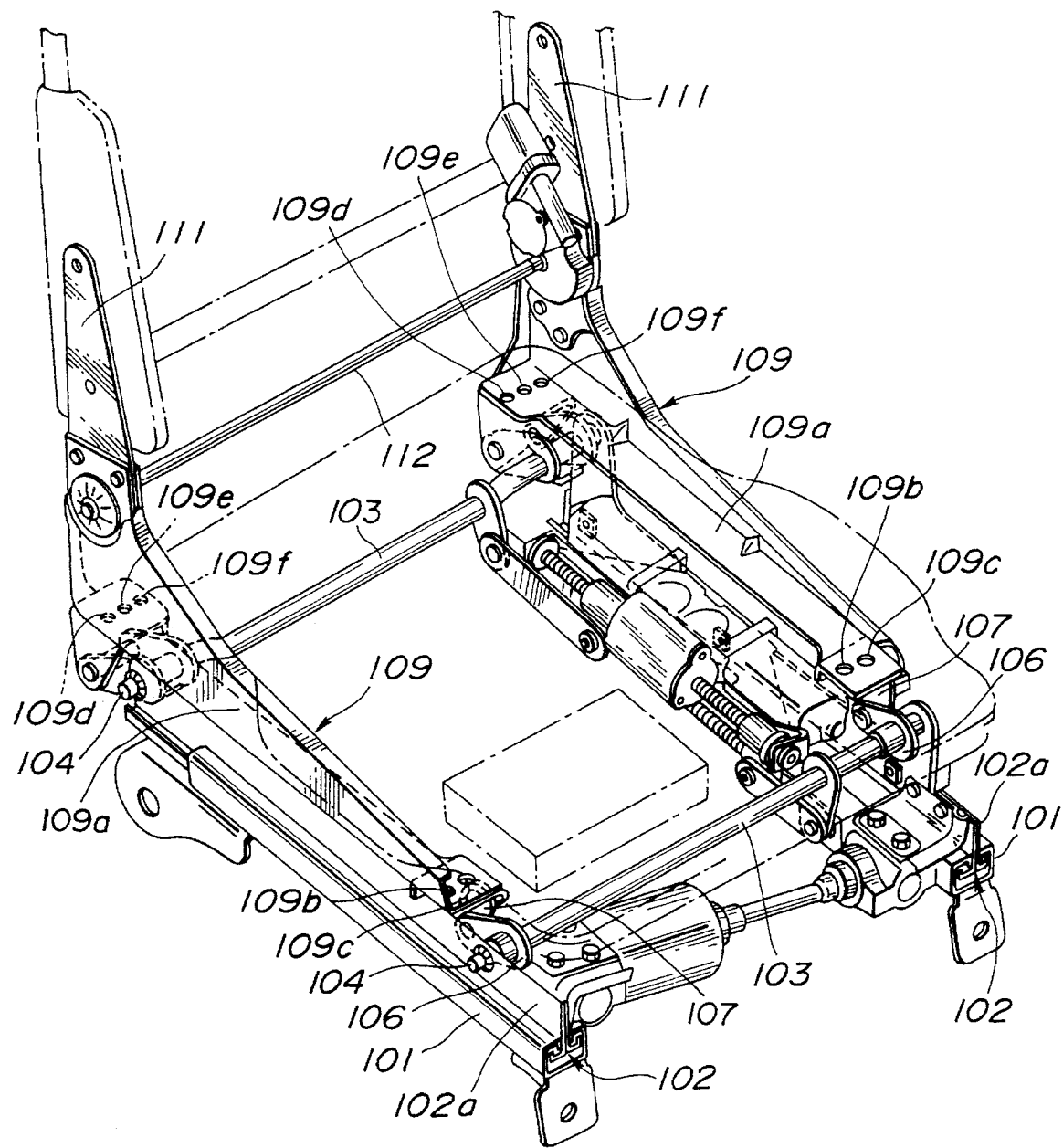
FIG. 4 is a perspective view showing a second preferred embodiment of the present invention.
Figure 5:
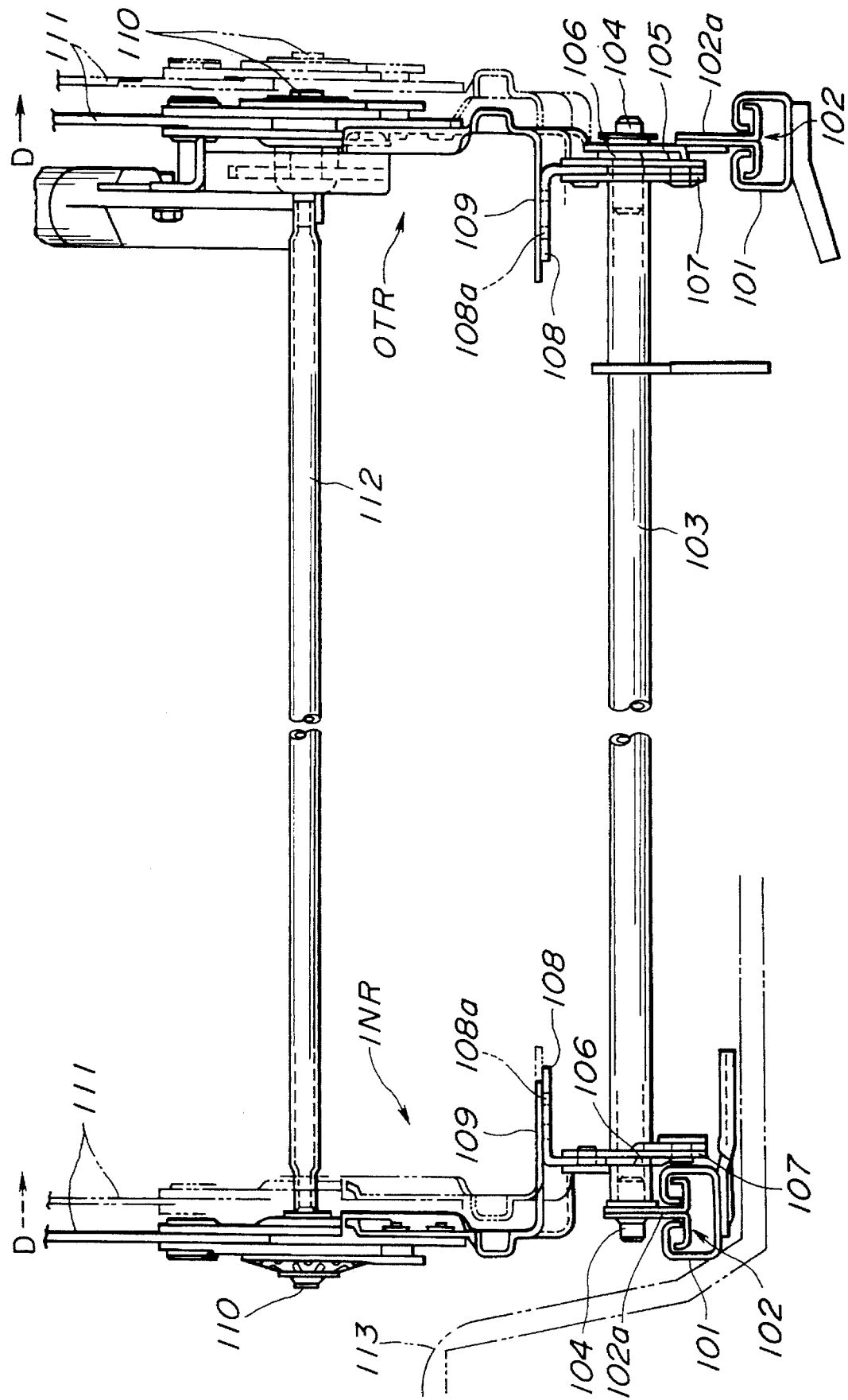
FIG. 5 is a front view showing the seat in FIG. 4.

Referring next to FIGS. 4 to 9, there is shown a second preferred embodiment of the present invention. Referring to FIGS. 4 and 5, a seat slide mechanism is constructed such that inner side (INR) and outer side (OTR) upper rails 102 are engaged with inner side (INR) and outer side (OTR) lower rails 101 mounted to the vehicle body, respectively, so as to be movable in the longitudinal direction thereof. A seat reclining mechanism having a seat lifter is disposed on the seat slide mechanism. There is a height difference between the inner and outer portions of the seat slide mechanism, i.e., a mounting position of the outer portion of the seat slide mechanism to the floor of the vehicle body is lower than that of the inner portion thereof. This is because of the floor of the vehicular body having a portion in the vicinity of a center console 113 higher than a door side portion.

Specifically, referring also to FIG. 5, vertical wall portions 102a of the inner upper rail 102 respectively rotatably support one end of each of the connecting rods 103, each one end being secured to a shaft 104 which is arranged through the vertical portion 102a of the inner upper rail 102, whereas vertical wall portions 102a of the outer lower rail 101 are connected to support plates 105 for rotatably supporting the other ends of the connecting rods 103, each other end being secured to a shaft 104 which is also arranged through the vertical portion 102a of the outer lower rail 101. That is, the inner and outer upper rails 102 are connected by the connecting rods 103 in front and rear portions thereof, respectively, as shown in FIG. 4.

The seat lifter is constructed such that levers 106 have one end fixed to the connecting rod 103 by welding or the like, and the other end to which one end of a link 107 is rotatably mounted, respectively, the other end of the link 107 being rotatably mounted to a side bracket 108. A power unit including electric motors (not shown) for rotating the levers 106 and the links 107 is mounted to the outer upper rail 102. As shown in FIG. 5, base plates 109 of the seat reclining mechanism are mounted on the side brackets 108, respectively.

As best seen in FIG. 5, the base plates 109 serve to fix a seat pan (not shown) for a seat cushion, each being provided with an arm 111 which is inclinable about a shaft 110 in the longitudinal direction of the seat slide mechanism, and to which a seat back (not shown) is mounted. The arms 111 are inclined together through a link rod 112 which is rotated by a power unit (not shown) comprising an electric motor.

The base plates 109 are formed symmetrically, and have substantially an L-shaped section, respectively. Referring to FIGS. 6 to 8, each base plate 109 has a wide bottom 109a which contacts the side bracket 108, and has a front portion formed with two through holes 109b, 109c to correspond to through holes 108a of the side bracket 108 and a rear portion formed with three through holes 109d, 109e, 109f, these through holes 109b to 109f being arranged at a predetermined interval D in the cross direction of the bottom 109a, respectively, as shown in FIGS. 4 and 7. The through holes 109b to 109f are bolt through holes for connecting the side bracket 108. As best seen in FIG. 8, each base plate 109 has a protruded portion 109g for reinforcement.

The interval D is established to correspond to a change of an interval between a driver's seat and an assistant driver's seat. Thus, an ordinary automotive vehicle uses the through hole 109c in the front portion, and the outer and center through holes 109f, 109e in the rear portion, whereas a wider, luxury automotive vehicle uses the through hole 109b in the front portion, and the inner and center through holes 109d, 109e in the rear portion. It is to be noted that through holes may be formed in the side bracket 108 instead of forming the through holes 109b to 109f in the bottom 109a of the base plate 109.

As shown in FIG. 5, mounted on the floor of the vehicle body of the ordinary and wider luxury automotive vehicles is the seat slide mechanism comprising the lower rails 101 and the upper rails 102, the lower rails 101 being at a predetermined distance from the center console 113, respectively. Thus, the same seat slide mechanism is used in the ordinary and wider luxury automotive vehicles.

Figure 9:
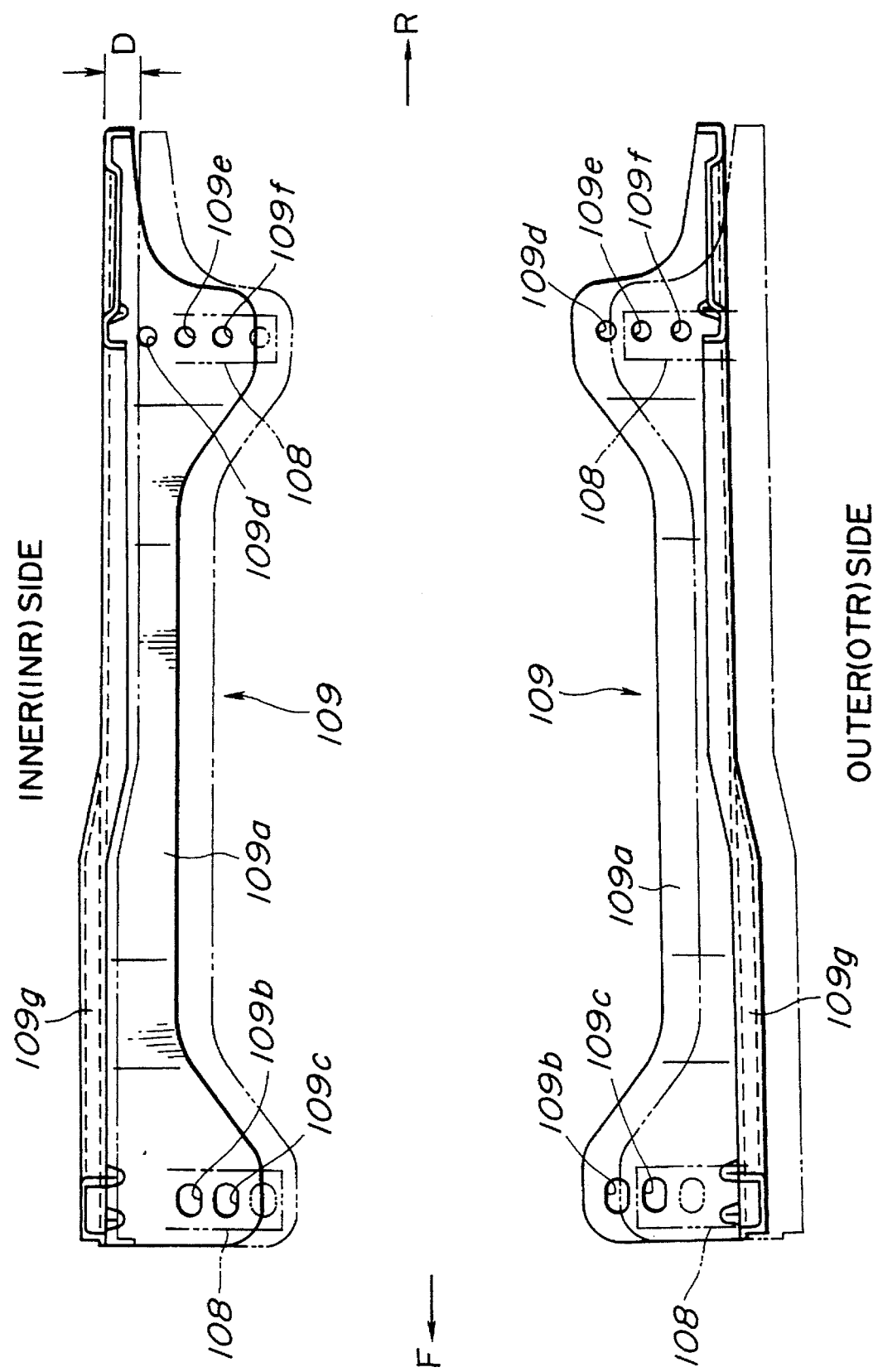
FIG. 9 is a view similar to FIG. 7, showing the base plates arranged on ordinary and wider, luxury automotive vehicles.

Referring to FIGS. 5 and 9, in the case of the ordinary automotive vehicle, each of the inner and outer base plates 109 is secured to the side bracket 108 as indicated by fully-drawn lines in FIGS. 5 and 9 through one bolt/nut inserted into the through hole 109c in the front portion of the base-plate 109 and two bolts/nuts inserted into the through holes 109e, 109f in the rear portion thereof.

On the other hand, in case of the wider luxury automotive vehicle, each of the inner and outer base plates 109 is secured to the side bracket 108 as indicated by two-dot chain lines in FIGS. 5 and 9 through one bolt/nut inserted into the through hole 109b in the front portion of the base plate 109 and two bolts/nuts inserted into the through holes 109d, 109e in the rear portion thereof.

Thus, as compared with the ordinary automotive vehicle, the wider luxury automotive vehicle can attain a state in which the center of the seat cushion is moved to the door side from the center console 113 by the interval D as indicated by two-dot chain lines in FIG. 5, resulting in an enlarged interval between the driver's seat and the adjacent passenger's seat.

In this embodiment, the seat reclining mechanism is disposed on the seat lifter and the seat slide mechanism. It is to be :noted that the seat reclining mechanism is also applicable to a seat with a seat lifter omitted.

As described above, a common use of all component parts enables a seat to be applicable to both of the ordinary and wider luxury automotive vehicles. Moreover, having an integration of the seat reclining mechanism with the seat slide mechanism in view, the two may be manufactured on independent lines in the manufacturing process, then integrated with each other in the assembling process to the floor of the automotive vehicle.

What is claimed is:

1. A seat for a vehicle having a body, comprising:
   a pair of first rails mounted to the body of the vehicle;
   a pair of second rails engaged with said pair of first rails, said pair of second rails having wall portions;
   a connecting rod rotatably arranged between said wall portions of said pair of second rails;
   a pair of links mounted to said connecting rod;
   a pair of side brackets rotatably mounted to said pair of links; and
   a pair of base plates mounted to said pair of side brackets, said pair of base plates having a bottom having first and second portions and an imaginary longitudinal axis, each portion being formed with at least two through holes at a predetermined interval in a cross direction with respect to said imaginary longitudinal axis of said bottom.

2. A seat as claimed in claim 1, wherein each of said pair of second rails has substantially an inverted T-shaped cross section.

3. A seat as claimed in claim 1, wherein each of said pair of links is of a double support type, which provides a double support when mounted to said connected rod.

4. A seat as claimed in claim 1, wherein each of said pair of base plates has substantially an L-shaped cross section.

5. A seat for a vehicle having a body, comprising:

a pair of first rails mounted to the body of the vehicle;

a pair of second rails engaged with said pair of first rails, said pair of second rails having wall portions;

a connecting rod rotatably arranged between said wall portions of said pair of second rails;

a pair of links mounted to said connecting rod;

a pair of side brackets rotatably mounted to said pair of links, each of said pair of side brackets having a portion formed with at least two through holes at a predetermined interval; and a pair of base plates mounted to said pair of side brackets, said portion of said each of said pair of side brackets corresponding to a bottom of each of said pair of base plates.

6. A seat as claimed in claim 4, wherein said pair of base plates has a protruded portion for reinforcement.

7. A seat as claimed in claim 5, wherein each of said pair of second rails has substantially an inverted T-shaped cross section.

8. A seat as claimed in claim 5, wherein each of said pair of links is of a double support type, which provides a double support when mounted to said connected rod.

9. A seat as claimed in claim 5, wherein said pair of base plates has a protruded portion for reinforcement.

* * * * *